March 9, 1965 C. VON KOCH ETAL 3,172,493
APPARATUS FOR THE CONTINUOUS MEASUREMENT OF
VARIATIONS IN THE WEIGHT OF A SUBSTANCE
Filed Sept. 25, 1961 6 Sheets-Sheet 1

Fig. 4

United States Patent Office 3,172,493
Patented Mar. 9, 1965

3,172,493
APPARATUS FOR THE CONTINUOUS MEASUREMENT OF VARIATIONS IN THE WEIGHT OF A SUBSTANCE
Claus von Koch and Herbert Roesky, Gottingen, Germany, assignors to Oskar Glemser, Gottingen, Germany
Filed Sept. 25, 1961, Ser. No. 140,575
Claims priority, application Germany, July 17, 1961, G 32,736
3 Claims. (Cl. 177—210)

The present invention relates to a method for the continuous measurement of variations in the weight of a substance or object relative to temperature, and also shows a suitable arrangement of a thermoelectric balance employed for said method. Continuously recording balances for the milligram range have often been designed, since such apparatus is the basis for work in the field of thermogravity in a high vacuum or a protective gas.

Two types of balances are known, i.e. the compensating or zero point scales, and the deflection scales. With the latter, deflection from zero is directly used for indicating the weight, while with compensating scales the force is measured which is necessary to return the scale to zero.

Deflection scales mainly use elastic forces for the return force. Since there is no ideal elastic material, these designs have the principal disadvantage of the non-constancy of the material used. For exact measurements, this necessitates a preliminary and a subsequent calibration of the deflection characteristic which fails, however, when the balance is only slightly overloaded upon depositing the object in the balance pan.

With compensating scales, conditions are more favorable, since the return force, based on the deflection, may be as great as desired. This means a very small deflection, so that the apparatus was named "zero point scale." The scales have the disadvantage that with increased amplification the smallest difficulties, as for instance a voltage change, etc. causes the unit to overshoot.

The compensating method employs a zero point indicator which passes the deflections from the zero point, in the form of a signal, to a control device for the return force. Thus, a mechanical dimension, i.e. the position of the balance, has to be transferred into an electric magnitude, which is then amplified accordingly. It has also been attempted to use a direct mechanical transmission for recording the weight. Since there are only small forces available, because of the small variations in weight, this upsets the measuring operation itself. This applies also to adjusting and contacting devices acting directly on the balance beam.

It has also been proposed to use, for the zero point indication, an optical image of a gap arrangement by means of revolving mirrors and photo-electric cells, the variations of an inductance by means of a differential transformer, or variations of a capacitance (compared with a fixed capacitor) in a bridge circuit. Since all methods of amplification are subjected to inherent disturbances, the control signal issued by the zero point indicator must be distinctly above the level of these disturbances.

It is one object of the present invention to provide a method of and apparatus for the continuous measurement of variations in the weight of a substance, relative to temperature, which eliminates the above described deficiencies of known measuring methods and devices.

It is another object of the present invention to provide a method of and an apparatus for the continuous measurement of variations in the weight of a substance, relative to temperature, wherein a thermoelectric balance is provided in which its deflection varies the capacitance of a capacitor, the variations of capacitance being used to cause frequency variations in an oscillator. By means of these frequency variations, a return force acting on the balance for the purpose of weight compensation, is controlled. The magnitude of this force which is continuously measured, forms a criterion for the variations in the weight of the substance. Preferably, the return force for the balance is produced by a magnet coil supplied with direct current, the core of the coil being formed of a permanent bar magnet. Here, the direct current forms a linear measure for the variations in weight.

It is still another object of the present invention to provide a method and apparatus for the continuous measurement of variations in the weight of a substance, relative to temperature, wherein a double-armed balance beam carries on one arm a carrier for the weights and on the other arm a capacitor plate, while two immovable capacitor plates are disposed cooperatively adjacent the first mentioned capacitor plate. A permanent bar magnet is disposed underneath and attached to the movable capacitor plate. Furthermore, a magnet coil is immovably fixed to the base of a balance housing and has the permanent bar magnet movable therein. An oscillator is operatively connected with the two immovable capacitor plates and is arranged for the frequency of the oscillator to be controlled by the change of the capacity between the movable capacitor plate and the two immovable capacitor plates generated by the movements of the balance beam. An amplifier and means for demodulation of the frequency signal to feed direct current to the magnet coil, to produce a compensating force on the beam, are provided. To increase the measurement accuracy, high-constant oscillators are used, which is achieved such, that the frequency definition in the oscillator is caused by a completely D.C.-free oscillating circuit in connection with the operation of oscillator tubes with automatic grid bias generation.

With these and other objects in view, which will become apparent in the following detailed description, the present invention will be clearly understood in connection with the accompany drawings, in which:

FIG. 4 is a circuit diagram connecting the oscillator with the filter, likewise shown in FIG. 1;

Figure 1:
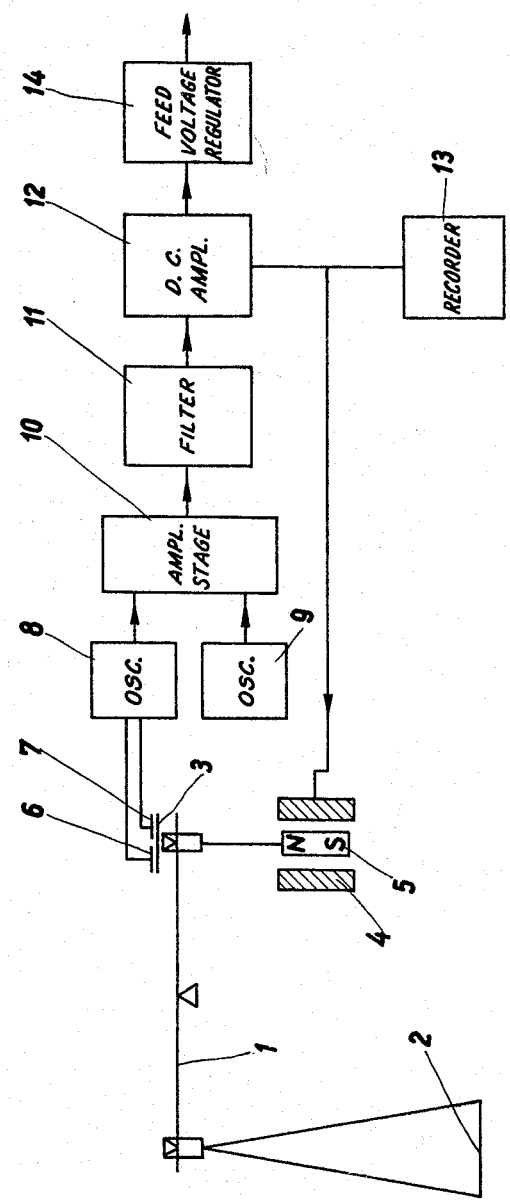
FIGURE 1 is a diagrammatic illustration of the complete apparatus.
Figure 2:
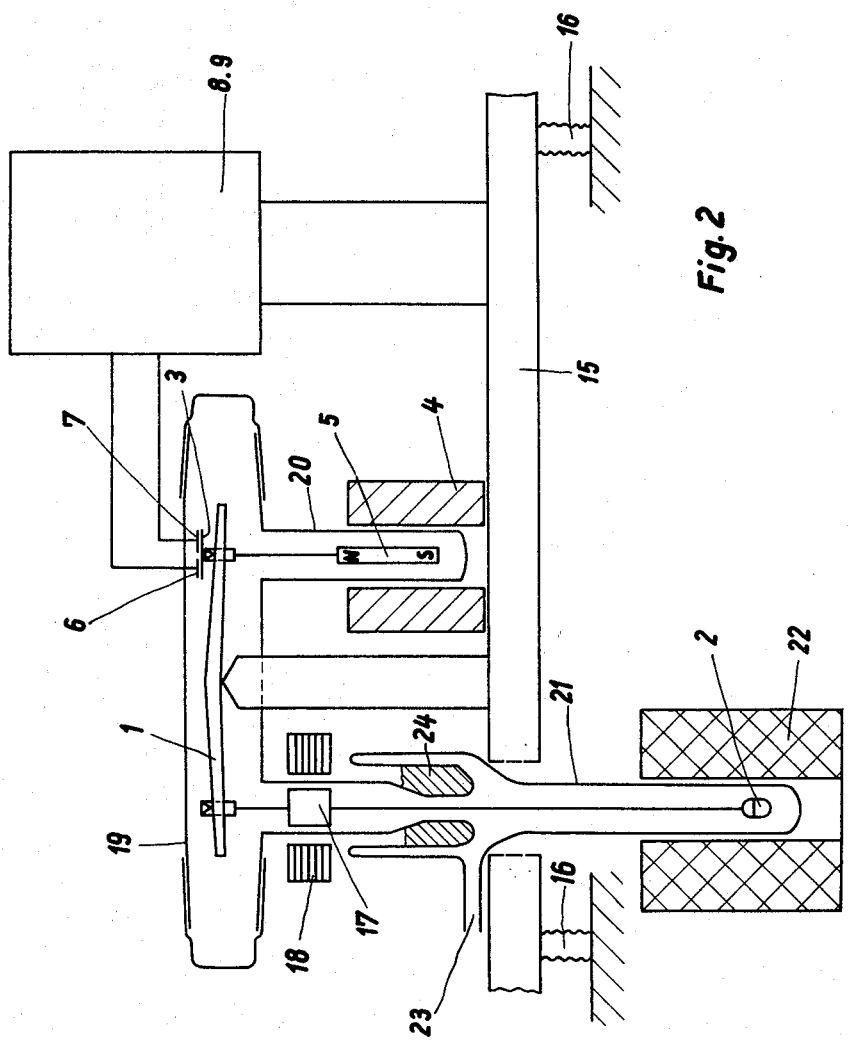
FIG. 2 is a diagrammatic illustration of the thermoelectric balance.

Referring now to the drawings, and in particular to FIGS. 1 and 2, the balance comprises a freely moving beam 1. Suspended from its one end is the balance pan 2 receiving the substance to be examined, while the other end of the beam is provided with a capacitor plate 3 and connected with a permanent bar magnet 5 which moves in a magnet coil 4.

The capacitor plate 3, provided on the balance beam 1, is arranged cooperatively adjacent two capacitor plates 6 and 7 which are operatively connected with an oscillator 8. The latter operates on a frequency comparison basis with an oscillator 9. Both oscillators 8 and 9 are connected to a filter 11 over a mixer and an amplifier stage 10. The filter 11 controls a D.C. amplifier 12. Its control current is recorded by means of a recorder 13 and is fed to the magnet coil 4. The anode and filament voltage for the valves in the stages 8 to 12 are maintained constant by means of a feed voltage regulator 14.

Figure 3:
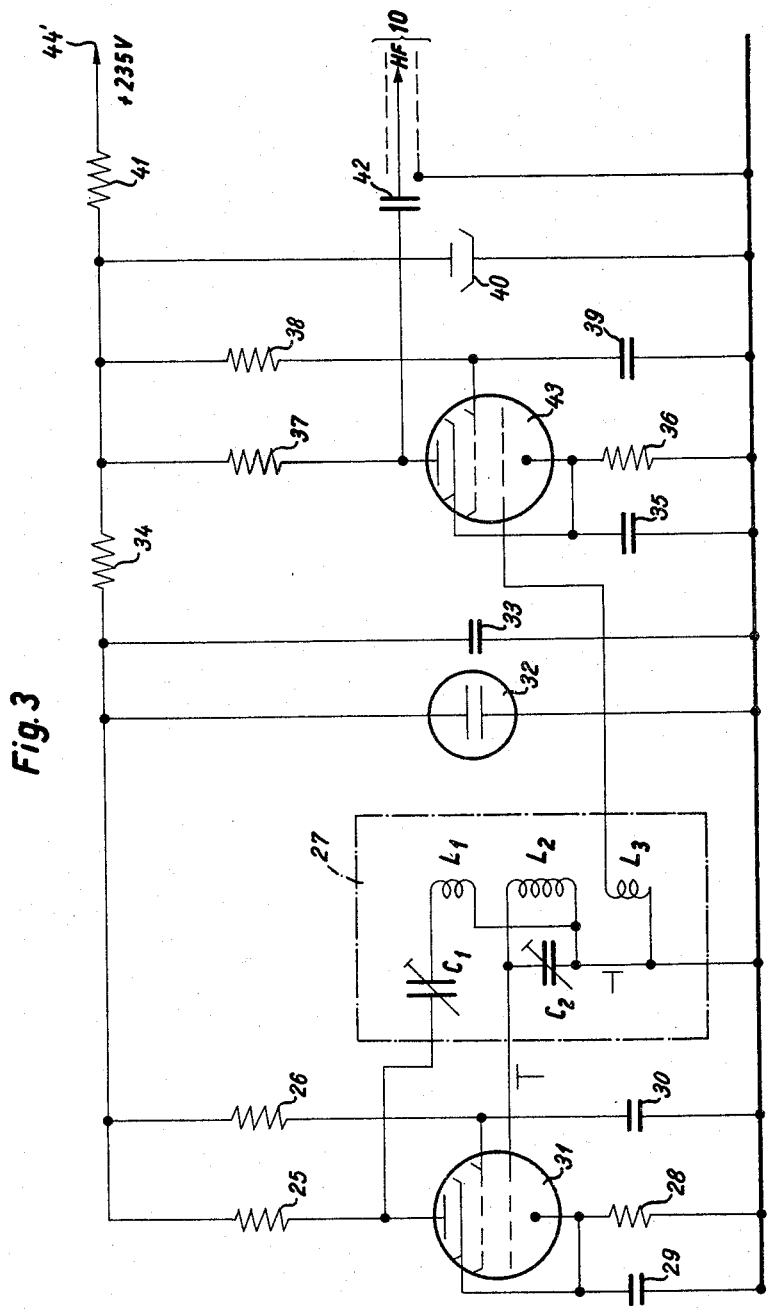
FIG. 3 is a circuit diagram connecting the capacitor plate with the amplifier stage, as disclosed in FIG. 1.

FIG. 3 shows the circuit and the wiring, respectively, of the oscillators 8 and 9, the capacitor plates 6 and 7 being operatively connected, as schematically indicated in FIG. 1.

Referring now again to FIG. 3, a vacuum-tube oscillator is disclosed which has a pentode 31 as an oscillating tube. It has an automatic grid bias producer with the resistance 28, which is crossed for higher frequencies by the condenser 29. The connection to the loading unit 27 is taken before the plate resistance 25. The loading unit 27 comprises a coupling coil $L_1$ with the coupling condenser $C_1$, the frequency determining oscillating circuit with the coil $L_2$ and the condenser $C_2$ and the coupling coil $L_3$ for the following buffer tube 43. The screen grid is fed over the resistance 26 and the blocking condenser 30.

The anode voltage for the oscillator valve 31 is maintained at a constant level by means of the stabilizer tube 32, the operating voltage of which is adjusted by means of the resistance 34. The condenser 33 serves the purpose of smoothing the anode voltage.

The buffer step comprises the pentode 43, the grid of which is connected with the coil $L_3$ of the loading unit. A cathode resistance 36 produces the bias and a condenser 35 bridges the high frequencies. The anode of the pentode 43 is fed over the resistance 37 and the high frequency has its output over the condenser 42. The screen grid of the pentode 43 is fed over the resistance 38 and blocked by means of the condenser 39. The anode voltage fed at 44 is blocked by means of the resistance 41 and the condenser 40 relative to the other circuits.

Figure 4:
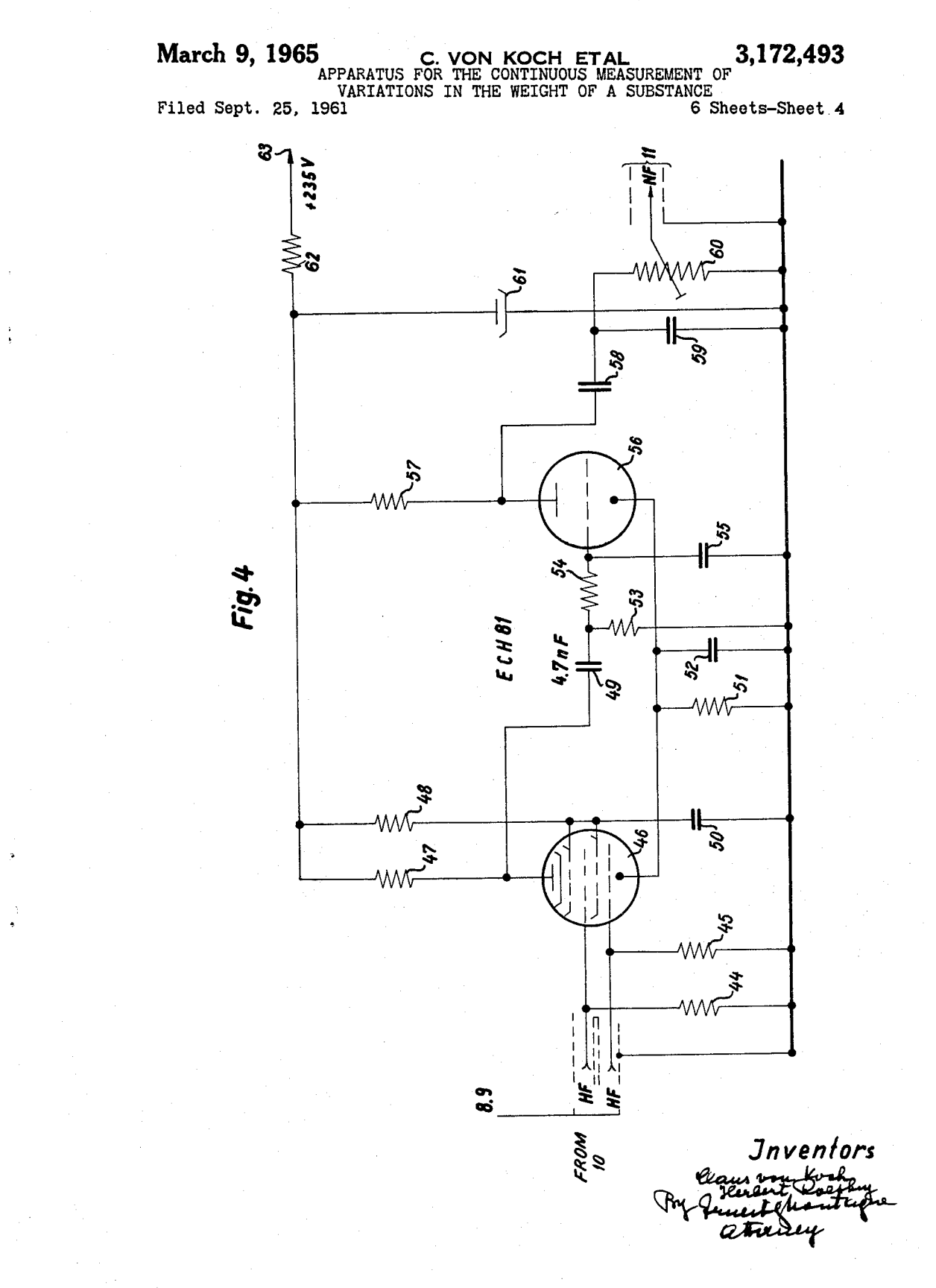

The high frequency taken at the point 10 of FIG. 3 is fed to the point 8 of FIG. 4 by means of a high frequency coaxial cable and is thus fed to the first grid of a mixing valve 46, the leakage resistance of which is formed by a resistance 44'. The high frequency of the second oscillator, designed exactly as the first one, is fed by means of a high frequency cable to the point 9 in FIG. 4 and is thus fed to the grid of the mixing valve 46, the leakage resistance of which is formed by the resistance 45.

Another tube 56 is provided and both tubes 46 and 56 have a common cathode resistance 51 and transition condenser 52, since both systems are disposed in the same valve bulb. A resistance 47 feeds the anode of the mixing valve 46 and the voltage emerging from the latter leads over a coupling condenser 49 and the RC-filter member 54 and the condenser 55 to the grid of the tube 56, which has a grid leakage resistance 54.

The screen grids of the mixing valve 46 are fed over the resistance 47 and blocked by the condenser 50. The anode of the tube 56 is fed over the resistance 57, the output of which feeds the low frequency over the coupling condenser 58 and the filter condenser 59 to the output potentiometer 60. The low frequency emerges at point 11 of FIG. 4 by means of the slide-wire of the potentiometer 60. The filter member, comprising the resistance 62 and the condenser 61 blocks this amplifying step from the tubes 46 and 56 against the central feeding voltage which is fed from the point 63 of FIG. 4.

Figure 5:
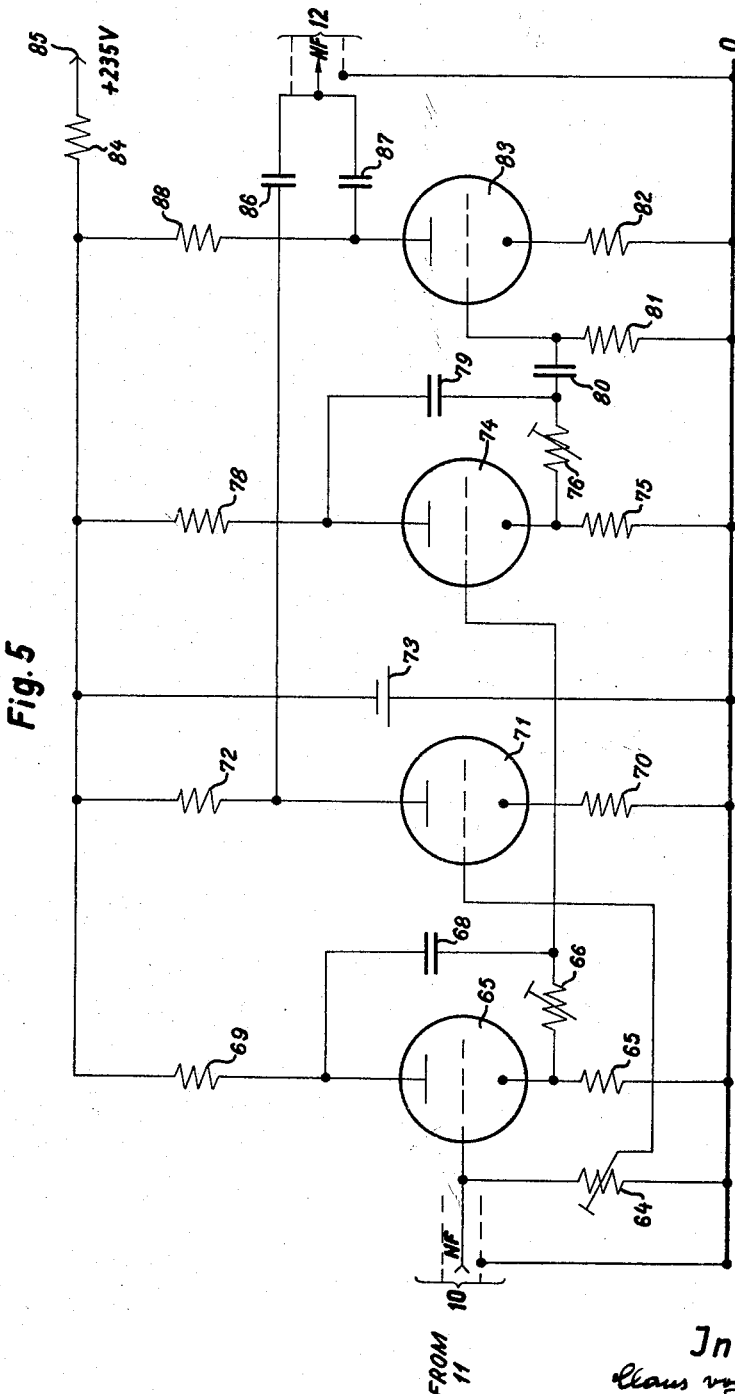
FIG. 5 is a circuit diagram connecting the amplifier with the D.C. amplifier, as a part of the showing in FIG. 1.

The low frequency filter, shown in FIG. 5, receives the low frequency from the point 11 of FIG. 4 and is fed to the point 10' of FIG. 5. It is fed to the grid of a tube 67, the grid-leakage resistance of which is formed by a potentiometer 64. The cathode of the tube 67 has a resistance 65 and its anode a resistance 69. The RC-member 66 and the condenser 68 are disposed between the anode and the cathode of the tube 67 and determine the frequency. The grid of a tube 74 is connected thereto. The grid leakage resistance of the tube 74 is formed by the resistances 65 and 66.

The frequency determining member comprising the resistance 76 and the condenser 79 is disposed between the cathode resistance 75 and the anode resistance 78 of the tube 74. The low frequency is then fed to the grid of a tube 83 over the condenser 80, the grid leakage resistance being formed by the resistance 81. The tube 83 has a cathode resistance 82 and an anode resistance 88 from which the low frequency is fed over the condenser 87 to the emergence point 12 of FIG. 5.

The grid of the tube 71 is connected with the slide-wire of the potentiometer 64 and the tube 71 has a cathode resistance 70 and an anode resistance 72. The coupling condenser 86 is connected to the latter, which coupling condenser 86 feeds the low frequency to the emergence point 12 of FIG. 5.

This tube step is blocked against the central anode voltage at the point 85 by means of the resistance 84 and the condenser 73.

Figure 6:
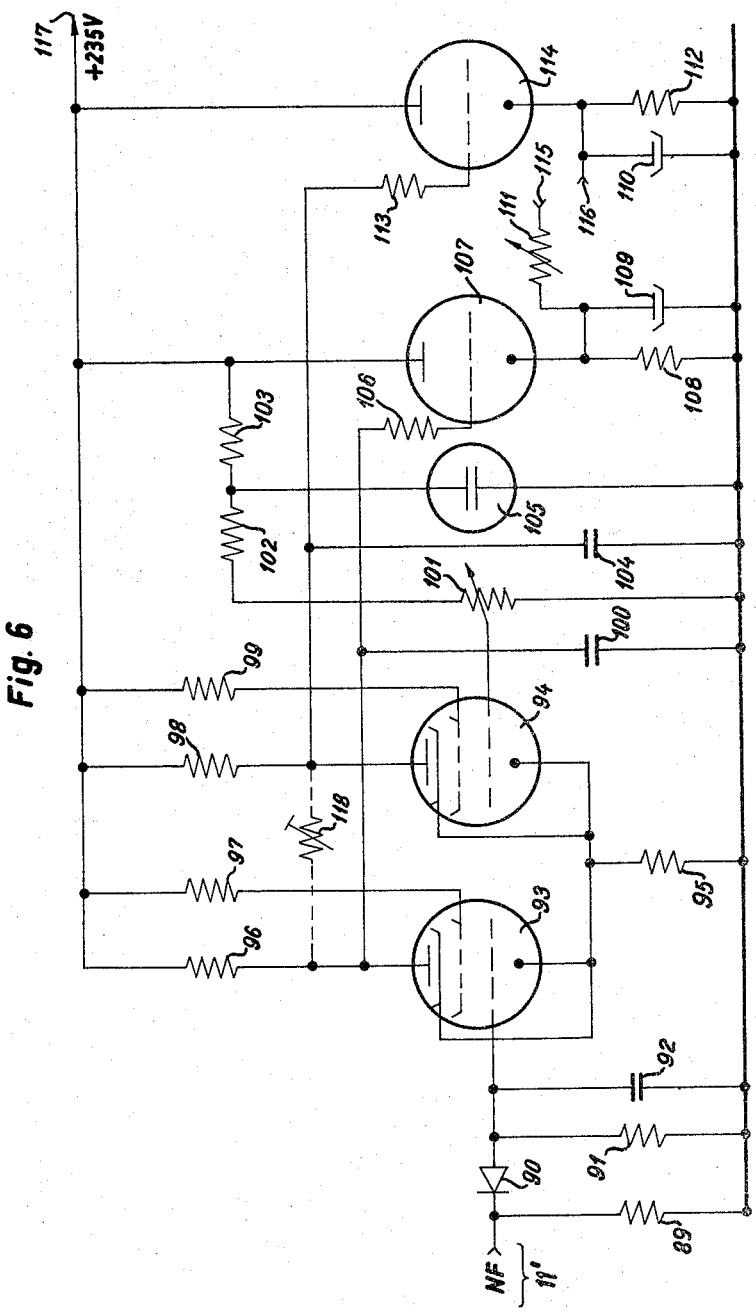
FIG. 6 is a circuit diagram connecting the filter with the recorder, as schematically shown in FIG. 1.

The low frequency is fed from the point of emergence 12 of FIG. 5 to the point 11' of FIG. 6. The alternating voltage emerging at the resistance 89 is rectified by the diode 90, so that a control rectified tension is created at the resistance 91 and the energy storage condenser 92, which control rectified tension is fed to the grid of the tube 93.

Another tube 94 is provided and both tubes 93 and 94 have the same cathode resistance 95, in order to bring about a phase shift between the anode resistance 96 and 98. The screen grid of the tube 93 is fed through the resistance 97 and the screen grid of the tube 94 is fed by the resistance 99. The control grid of the tube 94 is fed from the potentiometer 101 which is connected in a potential divider circuit over the resistance 102 on a stabilizer tube 105. The operating tension of the latter is adjusted by the resistance 103. The amplified, rectified tension having opposition of phase is fed from the anodes of the tubes 93 and 94 to the grids of tubes 107 and 114. This takes place from the anode of the tube 93 over the smoothing condenser 100 and the resistance 106, which is supposed to avoid natural oscillations of the steep end-tube 107. The same takes place from the anode of the tube 94 over the condenser 104 and the resistance 113 to the grid of the tube 114.

The end tube 107, as well as the tube 114, is disposed in a cathode amplifying circuit, the cathode resistance 108 of the tube 107 and the cathode resistance 112 of the tube 114 being bridged over by the condensers 109 and 110, respectively. A potentiometer 111 is disposed between the cathodes of the tubes 107 and 114. The output of this last amplifying step is connected with the terminals 115 and 116, to which a self restoring magnet and a line recorder are connected. The anodes of the tubes 107 and 114 are fed from the central anode tension 117 without resistances.

To obtain a high sensitivity in the operation of the apparatus, zero indication must be applied already to very small deflections of the balance beam. Since slight deflections cause small changes in capacity only, the oscillator 8 controlled thereby must have a high frequency-stabilizing effect. Otherwise, a frequency shift in the oscillator 8 would simulate a change in the position of the balance beam 1 which would result in an erroneous indication of the weight.

The oscillator disclosed in FIG. 3 of the drawings operates under the following principle:

The grid of the oscillator tube 31 is controlled by the frequency determining oscillating circuit $L_2$ and $C_2$, whereby not all coils of the loading unit 27 receive the D.C. anode current of the oscillator tube 31. By this arrangement it is achieved, that in case of emission variations of the cathode of the oscillator tube 31, the premagnetizing of the coils 27 is likewise not varied, whereby a frequency change would occur. Likewise, by the creation of a pretension by means of the resistance 28, it is avoided, that the oscillator tube 31 is controlled into the range of the grid current. This would cause the effect, that in case of emission variations of the cathode again frequency changes would occur. Furthermore, the adjusted anode tension, fed at the point 44 of FIG. 3, is additionally maintained at a constant level by means of the stabilizer tube 32, in order not to cause frequency changes of the oscillator by variations of the anode tension.

The floating step 43 is coupled to the oscillating loading coil unit 27 by means of the coil $L_3$. The floating step 43 serves the purpose of separating completely the oscillator circuit from the following tube steps, so that no feed-back can occur between the oscillators 8 and 9, as shown in FIG. 2 of the drawings. Such feed-back would prevent the possibility that both oscillators oscillate completely freely and independently from each other. This floating step 43 in a wide band amplifier circuit amplifies non-selectively the frequencies emerging from the oscillator 31. This is necessary, since by the control condenser connected with the oscillator tube at the point 6, the frequency is changed in a relatively wide range.

The non-controllable frequency changes can be suppressed to an extent with the help of the mentioned circuit measures, that a frequency cosntant of about $10^{-5}$ is achieved. It is necessary for this purpose, that for the coils and condensers 27 a particularly selected material and good structures are chosen.

In order to exclude, as much as possible, temperature effects, which would likewise cause non-controllable frequency changes, two geometrically exactly equally constructed oscillators of the above described type are disposed in a housing having a double wall. The housing is completely closed and has merely two openings for the tuning of the oscillators on the condenser $C_2$, which is provided.

The high frequency is fed from the point 10 of FIG. 3 to the point 8 of FIG. 4 and is then fed to the grid of the miving valve 46. This takes place likewise for the exactly equally designed second oscillator 9. The mixing valve 46 is designed in conventional manner. The differential frequency is created at the anode resistance 47. It is fed from here to a low frequency amplifier step 56, after filtering out the high frequency portion by means of the RC-member 54 and the condenser 55. The low frequency amplifying step 56 is likewise designed in known manner. The amplified low frequency tension is created at the anode resistance 57 and is fed to the point 11.

The low frequency is fed to the filter at the point 10' of FIG. 5, which filter transforms the frequency changes into corresponding amplitude changes. The filter is tuned by means of the potentiometers 66, 76 and 64, such that a frequency of about 3 kHz. cannot pass through. If the frequency fed to the point 10' deviates from 3 kHz., a low frequency amplitude is created at the point 12, which is nearly proportional to the deviation.

The tuning takes place in such manner that from a test oscillator is fed a frequency of 3 kHz. A test oscillograph is connected to the point 12. At first, the potentiometer 66 is so corrected, that a minimum tension is formed at the point 12. The same is done then with the potentiometer 76. The still prevailing remaining tension is suppressed by the potentiometer 64.

The filter effect is achieved in such manner, that tensions of equal amplitude having opposite phases are created in the step 67 by equal cathode- and anode-resistances 65 and 69. At this point the RC-member 66 and condenser 68 are located, the impedances of which are equally large in case of resonance and thus feed a strongly suppressed low frequency tension to the following step 74. The same procedure is followed at this point. A portion of the input voltage delivered through the potentiometer 64 is amplified in the step 71 in conventional manner and is added in opposition of phase to the point 12 due to the performed phase shift. In this manner the frequency of 3 kHz. is nearly completely suppressed. It is easily apparent, that these conditions do not apply any more for a frequency deviating from 3 kHz. and the more it deviates from 3 kHz., the easier can it pass the filter. This applies of course only to the low frequency range, since the circuit elements are designed therefor.

The low frequency, emerging from the filter at the point 12, has an amplitude though dependent upon the frequency changes, however, cannot be used yet for the control of the direct-current tension amplifier according to FIG. 6. For this reason a rectification takes place at the diode 90, so that a direct-current tension is created at the resistance 91, which direct-current tension is smoothed by the condenser 92. This direct-current tension is now fed to the rectified tension amplifier designed in a push-pull circuit. Both tubes 93 and 94 have the same cathode resistance 95, so that in this step a phase shift takes place. The amplified direct-current tension is thus taken between both anode resistances 96 and 98 and fed to the cathode follower, from the cathode resistances 108 and 112 of which the output is fed to the self-restoring magnet by means of the terminals 115 and 116. This output is controlled by the potentiometer 111. The potentiometer 118 (shown in dotted lines in the circuit of FIG. 6) can be used for the control of the amplifying factor of the direct-current tension amplifier. The direct-current tension neutral position of the amplifier is adjusted by the potentiometer 101.

The adjustment and the operation of the entire apparatus takes place in the following manner:

The scales are compensated upon filling in the testing substance by means of additional weights, which are applied by hand, such that it is in its zero position in the short circuited coil circuit for the self-restoring magnet. Then the oscillators 8 and 9 are adjusted such that they oscillate with a differential frequency of 3 kHz. within a range of about 1 mHz. This frequency of 3 kHz. is not passed by the filter 11 and the direct-current tension amplifier 12 does not receive any control voltage. It is adjusted such by the potentiometer 101 (FIG. 6) that no tension is created at the terminals 115 and 116. The short-circuit of the coil of the self-restoring magnet is now released and the apparatus is ready for operation.

The adjustment of the low frequency filter 11 has been described above. For the adjustment of the oscillators 8 and 9, no other auxiliary means are required, once they have been adjusted to the operating frequency of about 1 mHz. This is done at its best by means of an oscillograph. The deviations, occurring even after a long working period, are so small due to the frequency constancy of the oscillators, that they can be removed by slight rotation on the trimming condenser $C_2$ (FIG. 3).

By a corresponding geometrical structure of the entire arrangement of the scales it is achieved that the rising corrections occurring during the operation as vacuum scales are very small. No additional weight balance is, therefore, required. The adjustment can be performed, therefore, even with this manner of operation in the above described form.

The mechanical structure of the balance can be determined from FIG. 2. The balance is carried on a base plate 15 resting on rubber pads 16. The arm of the balance beam 1 which carries the balance pan 2 is provided with an attenuator pad 17 of aluminum operating in an attenuator magnet 18.

Preferably, the balance beam 1 is accommodated in a gas-tight housing 19 which has an extension 20 enclosing the permanent bar magnet 5 and extending into the coil 4, while an extension 21 of the housing 19 accommodates the balance pan and extends into the heat generator 22. A vacuum producer or a source for a protective gas or the like may be connected to a connection pipe 23. Between the housing 19 and the extension 21 a cooling trap 24 of known construction is provided.

As can be seen, the permanent bar magnet 5 is lowered into a cylindrical coil 4. The latter does not contain ferromagnetic material, but only the coil winding and an electrostatic screening. When the coil 4 is sufficiently long and the winding applied uniformly, the inside field is substantially homogeneous and dependent on the coil current only. The lowering permanent magnet 5 is subjected to a force which depends on the coil current only and which is practically proportional to the latter.

The compensating recorder 13 measures the coil current through means of a precision resistor. Calibration of the weight indication is directly in milligrams by loading the balance with weights.

When using a two-coordinate recorder, variations in weight can be recorded directly as a function of temperature.

Greater or smaller ranges of weight can be controlled by selecting suitable coils and fixed magnets (permanent magnets).

The attenuator device 17, 18 operates on the eddy current principle with an aluminum core 17 in a magnet 18 supplied with direct current and ensures that no mechanical forces can act on the balance beam 1. The cooling trap 24, arranged below, prevents the deposit of gas or vapor in the housing 19, formed during decomposition.

The balance pan 2 receiving the object is below the concrete base plate 15 which retains the heat coming from the heat generator 22 and is fixed to a platinum wire in a pipe of sintered corundum over which is moved the heat generator 22. The latter is connected to a program control unit which ensures a linear temperature rise dependent on the time. Below the balance pan there is a thermoelectric element (not shown), the thermoelectric voltge of which indicates the temperature of the object.

As compared to conventional devices, the apparatus described offers the following advantages:

(1) Possible use of the self-contained unit in a high vacuum, in gas, as well as under normal pressure (atmospheric pressure).

(2) Completely automatic, continuous indication of the vibrations in weight on a millivolt compensation recorder.

(3) Indication of the weight on a linear scale so that with an x–y recorder, weight-temperature diagrams can be recorded directly.

(4) Very high response sensitivity (short time constant).

(5) High zero constant.

(6) Completely free-moving balance beam (no wire connections, contacts or weights).

(7) Eddy current attenuation (no buoyancy corrections as with oil attenuation).

(8) No buoyancy corrections up to 1000 degrees Celsius under normal pressure.

(9) The high constant allows for a small time constant also in the amplifier part. The balance responds at once to smallest variations in the weight. Thus, decomposition stages have been found which could not be obtained with the balances of known construction. The time constant is determined by the mass of the balance beam only.

By designing the gas-tight housing 19 for the balance beam 1, accordingly, operation is possible in a high vacuum, a pre-vacuum, under normal pressure, and excessive pressure.

Operation in aggressive mediums is possible when selecting suitable materials, as for instance a "Teflon" sheathing for the complete system, or the use of parts made of a hard plastic material.

The temperature obtainable in the heat generator is a question of material. With respect to the weighing method employed no difficulties will arise with increased temperatures. By using the milligram range for measurement (the method may also be used for operation in the gamma range), errors caused by buoyancy are not essential. They can be reduced further by a suitable design of the geometric conditions of the system.

While we have disclosed one embodiment of the present invention, it is to be understood that this embodiment is given by example only and not in a limiting sense, the scope of the present invention being determined by the objects and the claims.

We claim:

1. An apparatus for the measurement of small weights comprising
    a balance housing having a base,
    a balance beam with free oscillatory motion,
    a carrier for said weights at one end of said balance beam and the other end of said balance beam having fixed thereto a capacitor plate, two immovable capacitor plates disposed cooperatively adjacent said capacitor plate,
    a permanent bar magnet underneath and attached to said capacitor plate,
    a magnet coil immovably fixed to said base of said balance housing and having said permanent bar magnet movable therein,
    an oscillator operatively connected with said two immovable capacitor plates and arranged for the frequency of said oscillator to be controlled by the change of the capacity between said movable capacitor plate and said two immovable capacitor plates, generated by the movements of said balance beam, and
    an amplifier and means for demodulation of said frequency signal to feed direct current to said magnet coil, to produce a compensating force on said beam.

2. An apparatus for the measurement of small weights comprising
    a balance housing having a base,
    a balance beam with free oscillatory motion,
    a carrier for said weights at one end of said balance beam and the other end of said beam having fixed thereto a capacitor plate, two immovable capacitor plates disposed cooperatively adjacent said capacitor plate,
    a permanent bar magnet underneath and attached to said capacitor plate,
    a magnet coil immovably fixed to said base of said balance housing and having said permanent bar magnet movable therein,
    an oscillator operatively connected with said two immovable capacitor plates and arranged for the frequency of said oscillator to be controlled by the change of the capacity between said movable capacitor plate and said two immovable capacitor plates, generated by the movements of said balance beam,
    an amplifier and means for demodulation of said frequency signal to feed direct current to said magnet coil, to produce a compensating force on said beam,
    said oscillator being a high-constancy-oscillator including a tube with automatic grid bias generation and a completely D.C. free oscillating circuit,
    said amplifier being operated on resistance-amplification,
    said demodulation circuit producing the difference signal of the two oscillator circuits, one of them being operated on changing frequency by said capacitor plates, the other being operated on constant frequency, the difference signal being demodulated by a resistance-capacitor-circuit, said circuit followed by a D.C. amplifier feeding said magnetic coil, and
    said magnetic coil comprising a long cylindrical body of non-ferromagnetic material including a winding of equal intervals, and
    an aluminum core disposed in said magnetic coil to attenuate the movements of said balance beam.

3. An apparatus for the measurement of small weights comprising
    a balance housing having a base,
    a balance beam with free oscillating motion, having two arms,
    a carrier for said weights mounted on one arm of said balance beam,
    the other arm of said balance beam having fixed thereto a capacitor plate and a permanent bar magnet, a magnetic coil immovably fixed to said base of said balance housing and having said permanent bar magnet movable therein, two immovable capacitor plates disposed cooperatively adjacent said capacitor plate, whereby during movement of the balance beam the distance between both immovable capacitor plates and the movable capacitor plate is changed, a high frequency oscillator connected with said two immovable capacitor plates and controlled in its frequency by the capacity variations between said movable capacitor plate and said immovable capacitor plates in response to the movement of said balance beam, the variable oscillator frequency being increased, and, thereby demodulated, and bringing about a frequency comparison relative to said high frequency oscillator, an R-C circuit receiving amplitude variations controlling said magnetic coil, so that the current in said magnetic coil constitutes a linear measure, for the weight variation of substance to be measured, the magnetic forces created by the current of said magnetic coil effecting said permanent bar magnet and compensating thus directly the weight variation.

References Cited by the Examiner

UNITED STATES PATENTS

| | | | |
|---|---|---|---|
| 1,089,826 | 3/14 | Emerson | 73—76 |
| 1,431,638 | 10/22 | Dowling | 177—210 |
| 1,602,213 | 10/26 | Robbins | 73—76 |
| 1,826,024 | 10/31 | Roller | 177—212 X |
| 1,967,424 | 7/34 | Nevitt | 34—48 |
| 2,371,040 | 3/45 | Fisher et al. | 177—16 |
| 2,602,660 | 7/52 | Shannon | 177—212 X |
| 2,631,027 | 3/53 | Payne | 177—212 X |
| 2,667,064 | 1/54 | Anderson | 73—76 |
| 2,734,736 | 2/56 | Payne | 177—212 X |
| 2,754,109 | 7/56 | Eyraud et al. | 177—212 X |
| 2,792,706 | 5/57 | Mauret | 73—76 |
| 2,832,535 | 4/58 | Sherman | 177—210 X |
| 2,914,310 | 11/59 | Bahrs | 177—210 X |
| 2,940,747 | 6/60 | Eder et al. | 177—212 X |
| 3,055,206 | 9/62 | Watson et al. | 73—15 |
| 3,074,270 | 1/63 | Rabb | 73—76 |

FOREIGN PATENTS

| | | |
|---|---|---|
| 622,581 | 12/35 | Germany. |
| 713,044 | 10/41 | Germany. |

OTHER REFERENCES

"The Ultra-Micrometer," by Prof. Whiddington, pages 634–639 of Philosophical Magazine, Series 6, vol. 40, 1920.

LEO SMILOW, *Primary Examiner*.

ABRAHAM BERLIN, LEYLAND M. MARTIN,
*Examiners.*